(12) United States Patent
Greene

(10) Patent No.: US 6,793,031 B1
(45) Date of Patent: Sep. 21, 2004

(54) LINES AND CABLES IN MOTORCYCLE FRAME TUBING

(75) Inventor: Aaron Greene, Reno, NV (US)

(73) Assignee: Paramount Custom Cycles, Reno, NV (US)

( * ) Notice: Subject to any disclaimer, the term of this patent is extended or adjusted under 35 U.S.C. 154(b) by 53 days.

(21) Appl. No.: 10/010,008

(22) Filed: Nov. 9, 2001

(51) Int. Cl.$^7$ ............................................. B62K 11/02
(52) U.S. Cl. ................ 180/225; 280/281.1; 285/133.4
(58) Field of Search ...................... 280/281.1; 180/219, 180/225; 285/386, 341, 343, 390, 133.4

(56) References Cited

U.S. PATENT DOCUMENTS

| | | |
|---|---|---|
| 389,180 A | 9/1888 | Wiggins |
| 2,128,720 A | 8/1938 | Tweedale |
| 2,736,949 A | 3/1956 | Kraemer |
| 3,064,707 A | 11/1962 | Walts |
| 3,291,510 A | 12/1966 | Kody |
| 4,253,224 A | 3/1981 | Hickman et al. |
| 4,340,244 A | 7/1982 | Scott |
| 4,346,923 A | 8/1982 | Smith et al. |
| 4,462,267 A * | 7/1984 | Shimano ...................... 74/489 |
| 4,565,383 A * | 1/1986 | Isaac .......................... 280/276 |
| 4,585,246 A * | 4/1986 | Diekman et al. ........ 280/281.1 |
| 4,655,486 A | 4/1987 | Tarnay et al. |
| 4,660,854 A | 4/1987 | Suzuki et al. |
| 4,678,054 A | 7/1987 | Honda et al. |
| 4,768,798 A * | 9/1988 | Reed et al. ............... 280/281.1 |
| 4,917,397 A * | 4/1990 | Chonan .................... 280/281.1 |
| 5,054,571 A * | 10/1991 | Takasaka ..................... 180/219 |
| D331,378 S * | 12/1992 | Muller et al. .............. D12/117 |
| 5,433,465 A * | 7/1995 | Klein et al. .............. 280/281.1 |
| 5,624,140 A | 4/1997 | Allen et al. |
| 6,007,112 A | 12/1999 | Kim |
| 6,186,550 B1 * | 2/2001 | Horii et al. .................. 280/833 |

FOREIGN PATENT DOCUMENTS

JP 3-82687 * 4/1991

* cited by examiner

Primary Examiner—Avraham Lerner
(74) Attorney, Agent, or Firm—Townsend Townsend and Crew LLP

(57) ABSTRACT

The present invention is directed to reducing the amount of exposed hydraulic lines and the like in a vehicle such as a motorcycle. Embodiments of the invention utilize the frame tubing to route the hydraulic lines through the fame to different parts of the vehicle. Different fittings are used to connect the hydraulic lines from the frame tubing to external lines. In accordance with an aspect of the present invention, an apparatus for routing a line through a vehicle frame tube comprises a line including an end portion configured to protrude from a side opening through a wall of the vehicle frame tube. The end portion of the line has at an end a fitting for coupling with an external line. A tube extension is configured to be attached to the wall of the vehicle frame tube around the side opening and to surround the end portion of the line. The tube extension is coupled with the fitting at the end of the line.

19 Claims, 4 Drawing Sheets

US 6,793,031 B1

LINES AND CABLES IN MOTORCYCLE FRAME TUBING

BACKGROUND OF THE INVENTION

The present invention relates generally to frame construction for motorcycles or the like and, more particularly, to providing lines or cables in the frame tubing of a motorcycle or the like.

To reduce weight and provide strength, tubular frames are commonly used in frame construction for motorcycles and other vehicles. A motorcycle frame typically includes a head pipe which extends generally vertically to support the front wheel for its steering movement. A plurality of frame tubes are affixed to the head pipe and extend rearwardly, and typically are joined near the rear wheel and/or in the area where the rider's seat is positioned. The engine and transmission of the motorcycle are usually positioned within the area bounded by the frame tubes, and may be supported by the tubes.

Hydraulic lines are commonly used in motorcycles and other vehicles to operate various components such as the brakes. Hydraulic lines are often unsightly and may sometimes be inconvenient.

BRIEF SUMMARY OF THE INVENTION

The present invention is directed to reducing the amount of exposed hydraulic lines and the like in a vehicle such as a motorcycle. Embodiments of the invention utilize the frame tubing to route the hydraulic lines through the frame to different parts of the vehicle. Different fittings are used to connect the hydraulic lines from the frame tubing to external lines.

In accordance with an aspect of the present invention, an apparatus for routing a line through a vehicle frame tube comprises a line including an end portion configured to protrude from a side opening through a wall of the vehicle frame tube. The end portion of the line has at an end a fitting for coupling with an external line. A tube extension is configured to be attached to the wall of the vehicle frame tube around the side opening and to surround the end portion of the line. The tube extension is coupled with the fitting at the end of the line.

In some embodiments, the fitting may comprise a male thread or a female thread. The fitting may comprise a freely spinning compression fitting. The end of the fitting may comprise a flared end coupled with the fitting.

In specific embodiments, the fitting comprises a compression fitting affixed to the end of the line. The tube extension is affixed to the fitting at the end of the line. The tube extension comprises two longitudinal tube sections which are joined together. The two longitudinal tube sections are welded together to form the tube extension and are configured to be welded to the wall of the vehicle frame tube around the side opening.

In accordance with another aspect of the present invention, an apparatus for routing a line through a vehicle frame tube comprises a line including two end portions each configured to protrude from a side opening through a wall of the vehicle frame tube. Each end portion of the line has at an end a fitting for coupling with an external line. A pair of tube extensions are each configured to be attached to the wall of the vehicle frame tube around one of the side openings and to surround the end portion of the line. The tube extension is coupled with the fitting at the end of the line.

In some embodiments, each fitting comprises a compression fitting affixed to the end a of the line. Each tube extension comprises two longitudinal tube sections which are joined together to form the tube extension and are configured to be joined to the wall of the vehicle frame tube around the side opening.

In accordance with another aspect of the invention, a method for routing a line through a vehicle frame tube comprises placing a line inside the vehicle frame tube and positioning an end portion of the line to protrude from a side opening through a wall of the vehicle frame tube, and providing at the end of the protruded end portion of the line a fitting for coupling with an external line. A tube extension is attached to the wall of the vehicle frame tube around the side opening to surround the end portion of the line and to couple with the fitting at the end of the line.

In some embodiments, the fitting comprises a freely spinning compression fitting. Providing the fitting may comprise affixing a compression fitting to the end of the line. Attaching the tube extension may comprise affixing the tube extension to the fitting at the end of the line. A flare may be formed at the end of the line to couple with the fitting. Attaching the tube extension may comprise joining two longitudinal tube sections together to surround the end portion of the line. The method may further comprise providing an external line with an external line fitting and coupling the external line with the end of the line by connecting the external line fitting with the fitting at the end of the line.

In specific embodiments, the method further comprises positioning a second end portion of the line to protrude from a second side opening through the wall of the vehicle frame tube, and providing at the second end of the second protruded end portion of the line a second fitting for coupling with a second external line. A second tube extension is attached to the wall of the vehicle frame tube around the second side opening to surround the second end portion of the line and to couple with the second fitting at the second end of the line.

DETAILED DESCRIPTION OF THE INVENTION

Figure 1:
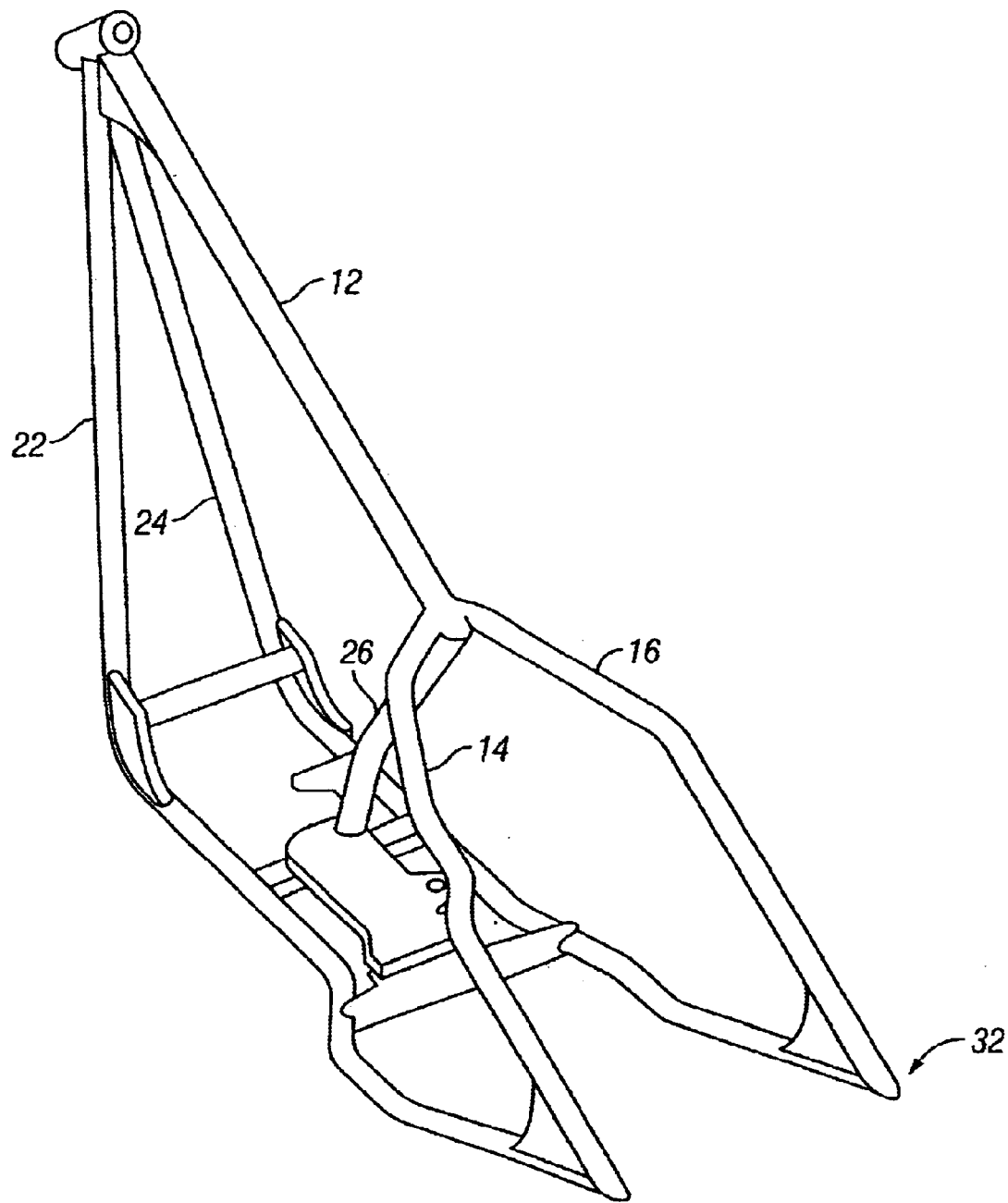
FIG. 1 is a perspective view of a motorcycle frame 10 according to an embodiment of the present invention.

FIG. 1 shows a frame 10 of a motorcycle having upper frame members 12, 14, 16 and lower frame members 22, 24 connected between the steering head 30 and the rear wheel mount 32. An intermediate frame member 26 extends between the upper frame members and the lower frame members. Each frame member may include multiple segments or sections. Some or all of the frame members 12–26 are typically tubes made of, for example, stainless steel or the like.

Figure 2:
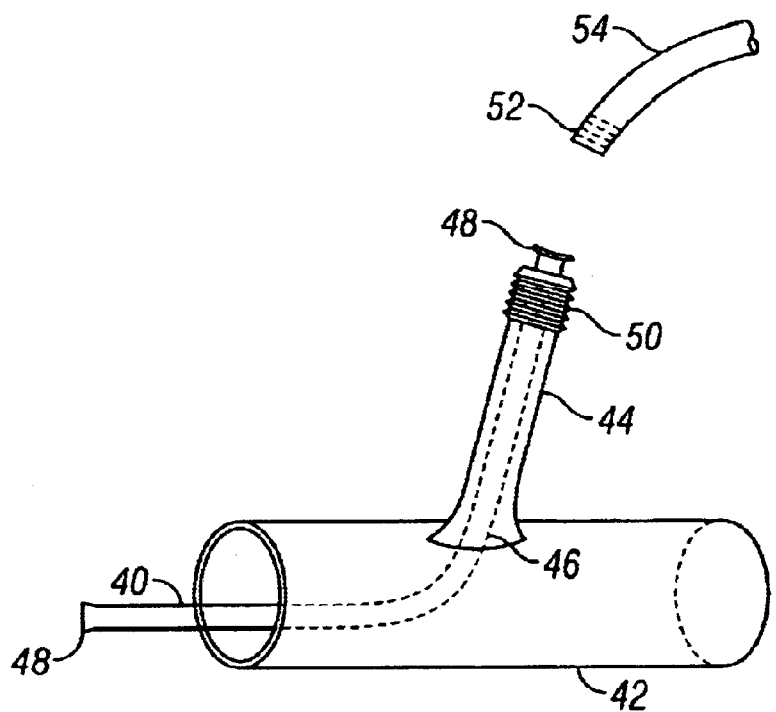
FIG. 2 is a perspective view of a hydraulic line 40 routed through a frame tube for coupling with an external hydraulic line according to an embodiment of the present invention.

FIG. 2 shows an example of utilizing the hollow frame tubes for routing internal hydraulic lines or other lines and coupling the internal lines to external lines. This embodiment employs a hydraulic line 40 disposed inside a frame tube 42. The hydraulic line 40 is typically a metal line made of stainless steel or the like. A tube extension 44 is provided at a side opening 46 of the frame tube 42 to allow the end of the hydraulic line 40 to be exposed for connecting with an external line. The tube extension 44 is typically made of metal such as stainless steel. In one example, the hydraulic line 40 is about 3/16 inch in diameter, while the tube extension 44 is about 3/8 inch in diameter. The hydraulic hardline 40 travels loosely inside the frame tube 42. The hydraulic line 40 includes flared ends 48 for improved sealing with the top of the tube extension 44. The tube extension 44 may include a threaded top 50 which is threadingly coupled to a threaded end 52 of an external hydraulic line 54.

Figure 3:
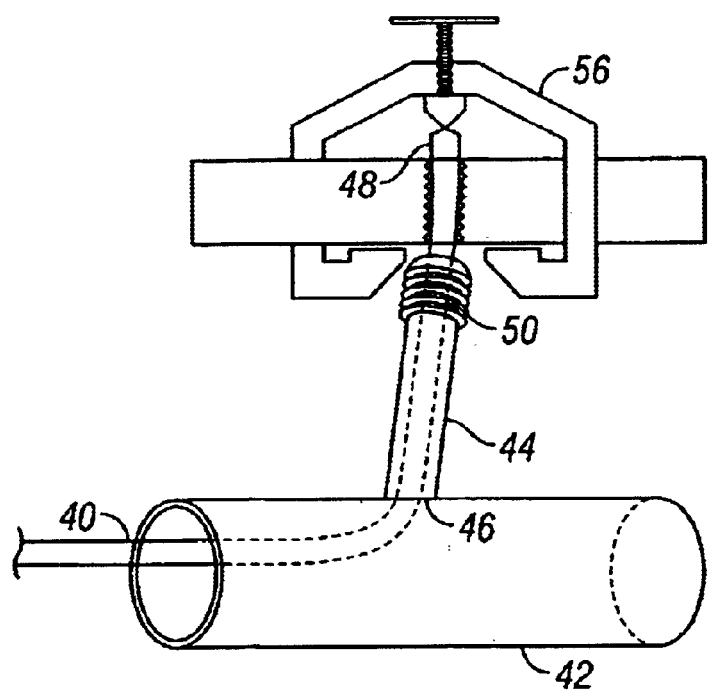
FIG. 3 is a schematic view illustrating the formation of a flared end 70 for the hydraulic line 40 of FIG. 2.

As shown in FIG. 3, the flared end 48 is typically formed by a flaring tool 56, which requires additional length (e.g., about one inch or more) of the hydraulic line 40 than normally needed in order to position the flaring tool 56 between the top 50 of the tube extension 44 and the hydraulic tube end 48. After the flared end 48 is formed, the portion of the hydraulic line 40 protruding from the top 50 is pushed back into the tube extension 44. Both ends of the hydraulic line 40 are to be flared. After forming the flare at one end 48, it may be difficult to achieve a suitable length at the opposite end for forming a flare.

Figure 4:
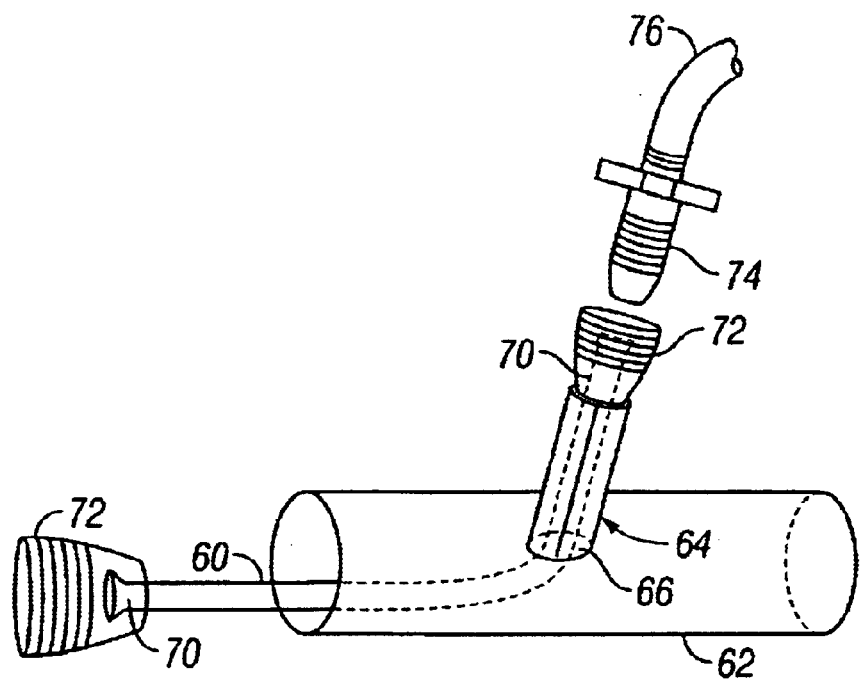
FIG. 4 is a perspective view of a hydraulic line 60 routed through a frame tube for coupling with an external hydraulic line according to another embodiment of the present invention.
Figure 5:
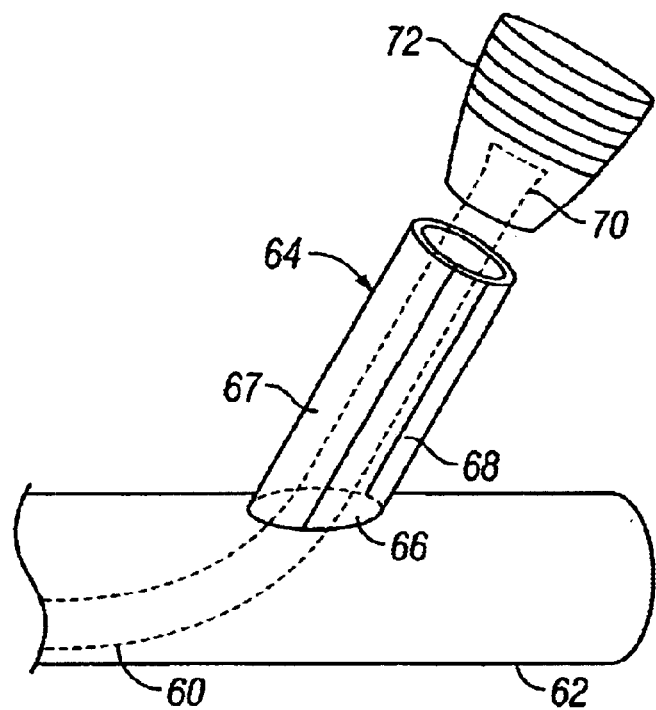
FIG. 5 is a perspective view of a tube extension 64 formed around a protruding portion of the hydraulic line 60 of FIG. 4.

In another embodiment shown in FIGS. 4 and 5, a hydraulic line 60 is disposed inside a frame tube 62. A tube extension 64 is provided at a side opening 66 of the frame tube 62 to allow the end of the hydraulic line 60 to be exposed for connecting with an external line. Again, the hydraulic line 60 may be about 3/16 inch in diameter, while the tube extension 64 may be about 3/8 inch in diameter. The hydraulic hardline 60 travels loosely inside the frame tube 62. In one example, the tube extension 64 is formed by joining two longitudinal tube extension sections 67, 68, for instance, by welding.

The hydraulic line 60 includes flared ends 70 for improved sealing with compression fittings 72. In one example, each compression fitting 72 has a female 1/8 inch pipe threading. A male compression fitting 74 is used to connect an external line 76 to the freely spinning female compression fitting 72 of the hydraulic line 60. The compression fittings 72, 74 are typically machined fittings made of brass. The external line 76 may be plastic. Because the ends 70 are flared, it is necessary to extend the hydraulic hardline 60 by about one inch or more to operate the flaring tool 56 (see FIG. 3). The tube extension 64 is used to accommodate the additional length, and forms a cover around the additional hydraulic hardline 60 protruding from the side opening 66 of the frame tube 62. In one example, the two halves 67, 68 of the tube extension 64 are welded around the protruding portion of the hardline 60 to support the hardline 60. The compression fitting 72 rests on top of the tube extension 64 with the flared end 70 connected therewith.

Figure 6:
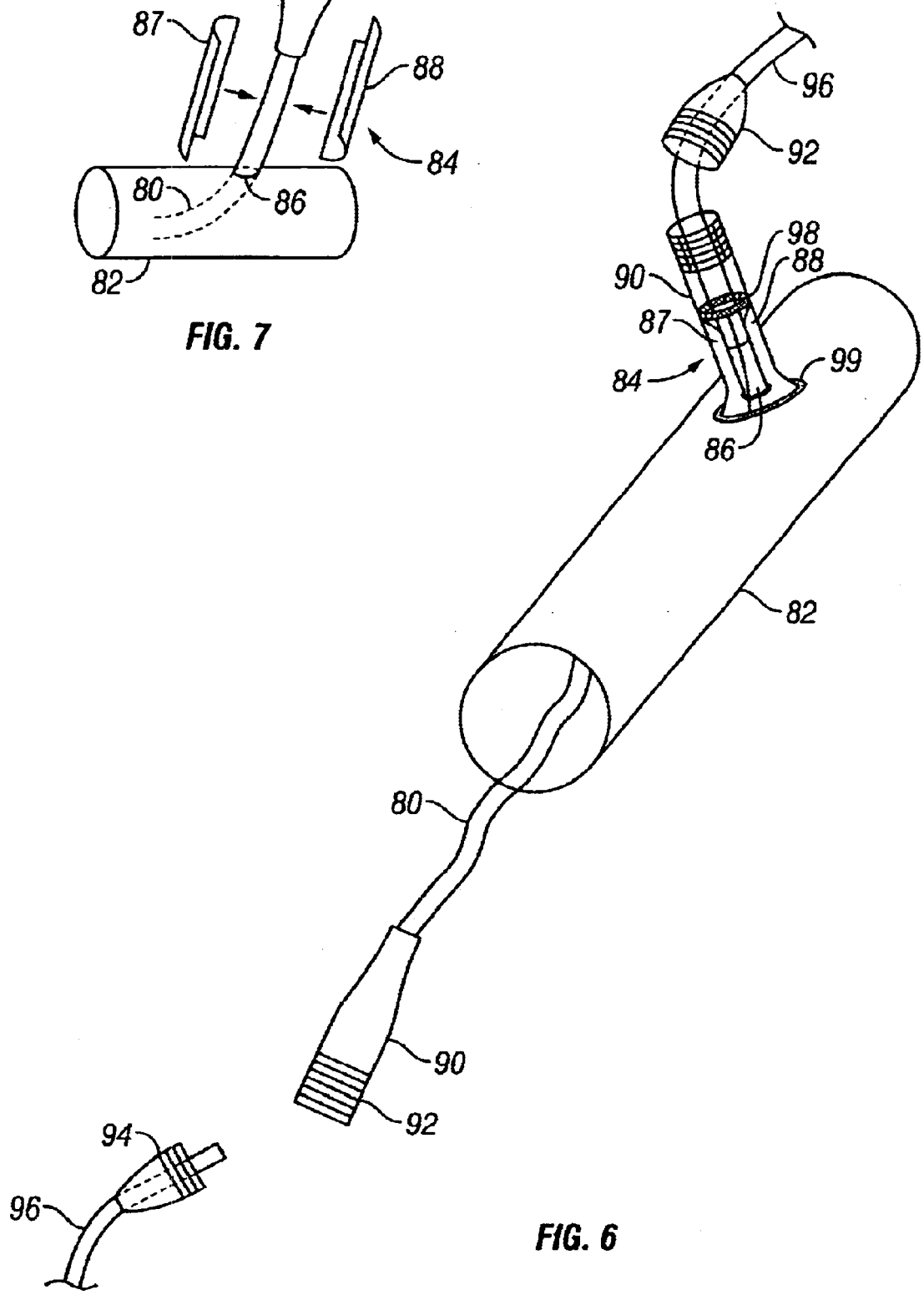
FIG. 6 is a perspective view of a hydraulic line 80 routed through a frame tube for coupling with an external hydraulic line according to another embodiment of the present invention.

In another embodiment as shown in FIG. 6, a hydraulic line 80 is disposed inside a frame tube 82. A tube extension 84 is provided at a side opening 86 of the frame tube 82 to allow the end of the hydraulic line 80 to be exposed for connecting with an external line. In one example, the tube extension 84 is formed by joining two longitudinal tube extension sections 87, 88, for instance, by welding.

Figure 7:
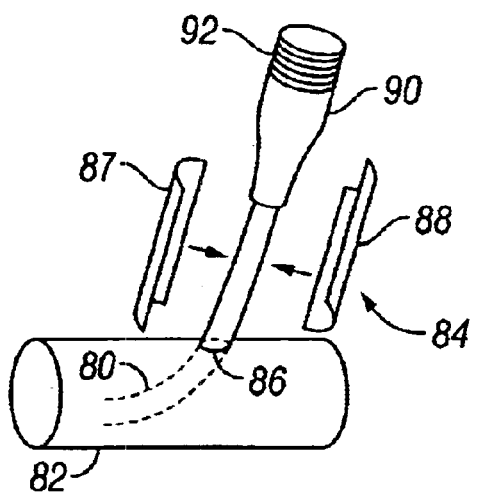
FIG. 7 is a schematic view illustrating the formation of a tube extension 84 around a protruding portion of the hydraulic line 80 of FIG. 6.

The hydraulic line 80 includes at the ends compression fittings 90. In one example, each compression fitting 90 has a male threading 92. The compression fittings 90 may be welded to the ends of the hydraulic line 80. A female compression fitting 94 is used to connect an external line 96 to the male threading 92 of the compression fitting 90 of the hydraulic line 80. The compression fittings 92, 94 are typically machined fittings made of brass. The external line 96 may be plastic. The tube extension 84 forms a cover around the portion of the hydraulic hardline 80 protruding from the side opening 86 of the frame tube 82. In one example as illustrated in FIGS. 6 and 7, the two halves 87, 88 of the tube extension 84 are welded around the protruding portion of the hardline 80 at a top weld 98 and around the side opening 86 at the bottom weld 99 to support the hardline 80. The two vertical seams of the tube extension sections 87, 88 are also fused by welding. In this embodiment, there is no need to form flared ends for the hydraulic line 80.

It is to be understood that the above description is intended to be illustrative and not restrictive. Many embodiments will be apparent to those of skill in the art upon reviewing the above description. By way of example, the present invention may extend to routing various lines and cables through frame tubes. The scope of the invention should, therefore, be determined not with reference to the above description, but instead should be determined with reference to the appended claims along with their full scope of equivalents.

What is claimed is:

1. An apparatus for routing a line through a vehicle frame tube, the apparatus comprising:
   a line including an end portion configured to protrude from a side opening through a wall of the vehicle frame tube, the end portion of the line having at an end a fitting for coupling with an external line; and
   a tube extension configured to be attached to the wall of the vehicle frame tube around the side opening and to surround the end portion of the line, the tube extension being coupled with the fitting at the end of the line;
   wherein the fitting comprises a freely spinning compression fitting having a female thread.

2. The apparatus of claim 1 wherein the end of the line comprises a flared end coupled with the fitting.

3. The apparatus of claim 1 wherein the fitting is affixed to the end of the line.

4. The apparatus of claim 1 wherein the tube extension is affixed to the fitting at the end of the line.

5. The apparatus of claim 1 wherein the tube extension comprises two longitudinal tube sections which are joined together.

6. The apparatus of claim 5 wherein the two longitudinal tube sections are welded together to form the tube extension and are configured to be welded to the wall of the vehicle frame tube around the side opening.

7. An apparatus for routing a line through a vehicle frame tube, the apparatus comprising:
   a line including two end portions each configured to protrude from a side opening through a wall of the vehicle frame tube, each end portion of the line having at an end a fitting for coupling with an external line; and a pair of tube extensions each configured to be attached to the wall of the vehicle frame tube around one of the side openings and to surround the end portion of the line, the tube extension being coupled with the fitting at the end of the line;

wherein the fitting comprises a freely spinning compression fitting having a female thread.

8. The apparatus of claim 7 wherein each fitting is affixed to the end of the line.

9. The apparatus of claim 7 wherein each tube extension comprises two longitudinal tube sections which are joined together to form the tube extension and are configured to be joined to the wall of the vehicle frame tube around the side opening.

10. The apparatus of claim 7 wherein the end of the line comprises a flared end coupled with the fitting.

11. The apparatus of claim 7 wherein each tube extension is affixed to the fitting at the end of the line.

12. An apparatus for routing a line through a vehicle frame tube, the apparatus comprising:

a line including an end portion configured to protrude from a side opening through a wall of the vehicle frame tube, the end portion of the line having at an end a fitting for coupling with an external line; and a tube extension configured to be attached to the wall of the vehicle frame tube around the side opening and to surround the end portion of the line, the tube extension being coupled with the fitting at the end of the line;

wherein the end of the line comprises a flared end coupled with the fitting, the flared end being flared outwardly with an enlarged size to capture the fitting.

13. The apparatus of claim 12 wherein the fitting comprises a male thread.

14. The apparatus of claim 12 wherein the fitting comprises a female thread.

15. The apparatus of claim 14 wherein the fitting comprises a freely spinning compression fitting.

16. The apparatus of claim 12 wherein the fitting comprises a compression fitting affixed to the end of the line.

17. The apparatus of claim 12 wherein the tube extension is affixed to the fitting at the end of the line.

18. The apparatus of claim 12 wherein the tube extension comprises two longitudinal tube sections which are joined together.

19. The apparatus of claim 18 wherein the two longitudinal tube sections are welded together to form the tube extension and are configured to be welded to the wall of the vehicle frame tube around the side opening.

* * * * *